US007683952B2

(12) United States Patent
Tominaga

(10) Patent No.: US 7,683,952 B2
(45) Date of Patent: Mar. 23, 2010

(54) OPTICAL IMAGE INFORMATION DETECTING APPARATUS

(75) Inventor: Hideki Tominaga, Kyoto-fu (JP)

(73) Assignee: Shimadzu Corporation, Kyoto (JP)

( * ) Notice: Subject to any disclaimer, the term of this patent is extended or adjusted under 35 U.S.C. 154(b) by 1222 days.

(21) Appl. No.: 10/890,997

(22) Filed: Jul. 15, 2004

(65) Prior Publication Data

US 2005/0018063 A1    Jan. 27, 2005

(30) Foreign Application Priority Data

Jul. 23, 2003  (JP) .............................. 2003-278360
Mar. 30, 2004  (JP) .............................. 2004-099657

(51) Int. Cl.
*H04N 3/14* (2006.01)
*H04N 5/335* (2006.01)

(52) U.S. Cl. ....................... 348/294; 348/308; 348/316; 348/317

(58) Field of Classification Search ................. 348/315, 348/316, 317, 294, 308; 358/483
See application file for complete search history.

(56) References Cited

FOREIGN PATENT DOCUMENTS

JP    2001-169189 A1    6/2001

*Primary Examiner*—Tuan Ho
*Assistant Examiner*—Selam Gebriel
(74) *Attorney, Agent, or Firm*—Cheng Law Group, PLLC

(57) ABSTRACT

In an image sensor of this invention, each image information detecting unit has one photoelectric converter, eight signal fetch gates for fetching signal charges from the photoelectric converter, and eight store and forward CCD arrays extending parallel to one another and connected to the signal fetch gates, respectively, for storing the signal charges. Only one of the eight signal fetch gates is switched ON in each electronic shuttering cycle synonymous with a photography cycle, to deliver a signal charge to a corresponding one of the store CCD arrays. When signal charges have been stored in all the first cells of the store CCD arrays after eight electronic shuttering cycles, the eight store CCD arrays perform one transfer operation all at once, to forward, in parallel, the eight signal charges to the next cells. This operation is repeated to perform high-speed photography at eight times the transfer speed of the store CCD arrays.

17 Claims, 13 Drawing Sheets

OPTICAL IMAGE INFORMATION DETECTING APPARATUS

BACKGROUND OF THE INVENTION (1) Field of the Invention

This invention relates to optical image information detecting apparatus used for obtaining two-dimensional images of an explosion or combustion (two-dimensional optical images) or of a spectrum in time of fluorescence annihilation (one-dimensional optical images). More particularly, the invention relates to a technique of high-speed photography for use in photographing high-speed phenomena.

(2) Description of the Related Art

Optical image information detecting apparatus for detecting high-speed phenomena include a high-speed image sensor for photographing high-speed phenomena at high speed. Such high-speed phenomena include an explosion, destruction and combustion, for example. As an apparatus for photographing such phenomena, a high-speed photographic apparatus (high-speed video camera) with a high-speed image sensor is used in scientific measurement. The photographing speed of the image sensor usually is about 30 frames per second. However, in high-speed photography for photographing a high-speed phenomenon, a photographing time for one frame is one microsecond, for example, that is a photographing speed at one million frames per second.

FIG. 1 is a schematic view showing an image sensor used in a conventional high-speed photographic apparatus. As shown in FIG. 1, the image sensor has photosensitive units 101, storage units 103, vertical transfer units 105, a horizontal transfer unit 107 and an amplifier 109. Each photosensitive unit 101 is formed of a photoelectric converter, typically a photodiode. Each storage unit 103 has a plurality of cells formed of CCDs (Charge Coupled Devices) connected in series. An electric signal for one pixel is acquired by one photosensitive unit 101 and stored in one storage unit 103 (as enclosed in a dotted line in FIG. 1). Thus, an 80,000-pixel image sensor includes 80,000 pairs of photosensitive units 101 and storage units 103 in a two-dimensional arrangement.

The photosensitive unit 101 converts incident light into an electric signal in each electronic shuttering cycle, i.e. at an electronic exposure time. After the exposure time, the electric signal converted is delivered to a first cell Ch of the storage unit 103 through a signal fetch gate not shown. At this time, the electric signal is moved by forming a potential gradient over the photosensitive unit 101, signal fetch gate and first cell Ch. After the signal delivery, an exposure time starts and the photosensitive unit 101 generates an electric signal again. The storage unit 103 forwards electric signals stored in the cells to next adjacent cells synchronously with the above signal delivery. Upon completion of a series of photographic operations, the vertical transfer units 105 and horizontal transfer unit 107 fetch the electric signals stored in the storage units 103.

In this way, the image sensor for high-speed photography having the storage units 103 can fetch electric signals en bloc after a photographing operation, which would otherwise take a relatively long time. It is therefore possible to increase the photographing speed to a rate of transfer of the electric signals from the storage units 103.

In the image sensor for high-speed photography, each photosensitive unit 101 has a large area compared with each cell of the storage unit 103. This construction is adopted to provide a high open area ratio (fill factor) in order to secure a sufficient quantity of light incident on the photosensitive unit 101 in a short electronic shuttering cycle (exposure time). In order to arrange, without a gap, the photosensitive unit and storage unit which differ in size and shape, an actual image sensor is devised to set the storage unit aslant. Such an image sensor is disclosed in Japanese Unexamined Patent Publication No. 2001-169189, for example.

However, signal transfer cannot be performed smoothly in the case of a high-speed photography at such a high rate as one million frames per second. Specifically, the following problems (I) and (II) are encountered:

Problem (I)

Photographing speed is variable with the electronic shuttering cycle, i.e. exposure time. When the electronic shuttering cycle is shortened, the photographing speed will become fast. However, when the electronic shuttering cycle is shortened, the transfer rate described above must also be raised. Unless the transfer rate is raised, the electric signals will stagnate instead of being transferred, and the photographing speed cannot exceed the transfer rate. However, if the transfer rate is raised by increasing clocking speed, the storage units 103 will generate heat which could cause inconveniences and in some cases to the extent of destroying the devices. Thus, the transfer rate cannot be increased easily. The photographing speed is determined by the transfer rate, and cannot be increased.

Problem (II)

Electric signals cannot be fetched (delivered) completely from the photosensitive units 101 to the first cells Ch of the storage units 103. As a result, the electric signals generated at a preceding exposure time remain in the photosensitive units 101 until a next exposure time, thereby causing an afterimage. This is considered due to the area of each photosensitive unit being large compared with that of each cell, which makes it impossible to form a proper potential gradient from the photosensitive unit to the cell. Since each photosensitive unit has a large area, electric charges moving even at a constant speed would only consume time. As a result, the signals cannot be transferred smoothly, thereby causing an afterimage.

SUMMARY OF THE INVENTION

This invention has been made having regard to the state of the art noted above, and its object is to provide optical image information detecting apparatus capable of a smooth signal transfer.

The problem (I) above is solved, according to this invention, by an optical image information detecting apparatus having a photoelectric conversion device for generating electric signals according to intensities of incident light, comprising:

first signal fetch devices for fetching the electric signals generated in the photoelectric conversion device; and first store and forward devices for forwarding the electric signals fetched and delivered by the first signal fetch devices;

wherein the first signal fetch devices, M in number, M being an integer at least two, are connected in parallel with one another to the photoelectric conversion device, one in number;

each of the first store and forward devices includes cells, N in number, N being an integer at least two, connected in series, and is connected to one of the first signal fetch devices;

the first signal fetch devices are arranged to fetch the electric signals repeatedly in a predetermined order; and each of the first store and forward devices is arranged to forward electric signals previously delivered from one of the first signal fetch devices, successively to downstream cells, by the time a next electric signal is delivered.

With the optical image information detecting apparatus according to this invention, when detecting optical image information, one photoelectric conversion device generates electric signals according to intensities of incident light. On the other hand, the first signal fetch devices, M in number, connected in parallel with one another to the one photoelectric conversion device repeatedly fetch, in a predetermined order, the electric signals generated in the photoelectric conversion device, and deliver the electric signals to the first store and forward devices connected respectively to the first signal fetch devices and each having cells, N in number, connected in series. The cells of each first store and forward device forward electric signals received previously to adjacent downstream cells in the same store and forward device by the time a next electric signal is delivered. In this way, the electric signals stored in the cells of the first store and forward devices are fetched at suitable times. An optical image is edited and created from the electric signals.

Thus, with the apparatus according to this invention, the first signal fetch devices, M in number, are connected in parallel with one another to one photoelectric conversion device, and the first store and forward devices, each having cells, N in number, connected in series, are connected respectively to the first signal fetch devices. The first signal fetch devices repeatedly fetch the electric signals in a predetermined order, and the electric signals previously delivered from the first signal fetch devices are forwarded successively to downstream cells of the store and forward devices by the time next electric signals are delivered.

With the apparatus according to this invention, therefore, the first store and forward devices, each having cells, N in number, connected in series, are connected separately from one another to the first signal fetch devices, M in number, which fetch the electric signals from the one photoelectric conversion device. In each electronic shuttering cycle of the photoelectric conversion device, an electric signal is fetched from one of the M first signal fetch devices, and transferred to a first cell of the corresponding first store and forward device. In the next electronic shuttering cycle, an electric signal is fetched from one of the first signal fetch devices excluding the above first signal fetch device, thus M−1 in number, and transferred to a first cell of the corresponding first store and forward device. This is repeated M times, and after electric signals are stored in all the first cells of the M first store and forward devices, the electric signals in the cells of the M first store and forward devices are forwarded to the next cells all at once. Since the cells of the first store and forward devices perform just one forwarding operation for every M electronic shuttering times, the forwarding cycle is M times the electronic shuttering cycle.

Thus, even though electronic shuttering speed, i.e. photographing speed, is fast, the cells of the first store and forward devices operate at a transfer rate of 1/M, thereby greatly suppressing a generation of heat accompanying clocking. From the opposite point of view, the photographing speed may be increased M times, instead of being determined by the transfer rate.

In the invention described above, the optical image information detecting apparatus, preferably, further comprises temporary signal holding devices for temporarily holding the electric signals received from the first signal fetch devices, wherein the temporary signal holding devices are disposed between the first signal fetch devices having signal fetch timing coinciding with a signal non-acceptance time of the first store and forward devices that receive the electric signals first, and the cells of the first store and forward devices that receive the electric signals first, and the temporary signal holding devices are arranged to hold the electric signals until the first store and forward devices shift to a signal acceptance state.

With this construction, the electric signals are temporarily held by the temporary signal holding devices disposed between the first signal fetch devices having signal fetch timing coinciding with a signal non-acceptance time of the first store and forward devices that receive the electric signals first, and the cells of the first store and forward devices that receive the electric signals first. The electric signals are temporarily held until the first store and forward devices shift to the signal acceptance state. The temporary signal holding devices deliver the electric signals to the first store and forward devices as soon as the latter shift to the signal acceptance state. Consequently, even if a discrepancy in time occurs between the fetching of the electric signals by the first signal fetch devices and acceptance of the electric signals by the first store and forward devices, the electric signals may be fetched and delivered easily and smoothly.

In one example of the above construction according to the invention, the apparatus includes a plurality of image information detecting units arranged along array lines, each of the image information detecting units having the photoelectric conversion device, the first signal fetch devices, and the first store and forward devices.

Where the optical image information detecting apparatus includes such image information detecting units, the number M of the signal fetch gates in each image information detecting unit, preferably, is in a range of five to 15, and the number N of the store and forward cells, preferably, is in a range of five to 15.

With settings made in the above range, the signal transfer cycle of the first store and forward devices may be made as slow as five to 15 times the electronic shuttering cycle of the photoelectric conversion device. The number M of the first signal fetch devices less than five would produce only an insufficient effect of reducing power consumption accompanying clocking, and tends to hamper improvement in photographing speed in relation to the transfer rate. Where the number M is 16 or more, the first signal fetch devices would be too small relative to the photoelectric conversion device, which tends to impair the promptness of signal fetching.

The number N of the cells in each first store and forward device less than five would be capable of storing only a small amount of information, thereby tending to produce a dynamic image of insufficient length. Where the number N is 16 or more, the photoelectric conversion device would occupy a reduced area in each image information detecting unit, tending to lower the open area ratio (fill factor).

The problem (II) above is solved, according to this invention, by an optical image information detecting apparatus having photoelectric conversion devices for generating electric signals according to intensities of incident light, comprising:

second signal fetch devices provided for the photoelectric conversion devices for fetching the electric signals generated in the photoelectric conversion devices; and a collecting device for receiving the electric signals from the second signal fetch devices, and generating a pixel signal integrating the electric signals;

wherein the plurality of photoelectric conversion devices, the plurality of the second signal fetch devices and the one collecting device are arranged to acquire pixel signals each corresponding to one pixel.

With the optical image information detecting apparatus according to this invention, the electric signals generated by the plurality of photoelectric conversion devices are fetched therefrom by the second signal fetch devices, respectively.

The electric signals fetched are collected by the collecting device into a pixel signal corresponding to one pixel. In this way, the electric signals are read from the plurality of photoelectric conversion devices in order to acquire a pixel signal corresponding to one pixel. Each photoelectric conversion device may therefore have a reduced area. The electric signals may be fetched from the respective photoelectric conversion devices at high speed in a reduced time. As a result, the electric signals may be transferred smoothly, and are prevented from remaining in the conversion devices, thereby suppressing generation of an afterimage. With each photoelectric conversion device having a reduced area, on-chip microlenses may be built in to realize an improved open area ratio.

In the invention described above, the optical image information detecting apparatus, preferably, further comprises a distributing device for receiving the pixel signals from the collecting device, and second store and forward devices for receiving the pixel signals from the distributing device, and forwarding the pixel signals, wherein each of the second store and forward devices includes a plurality of cells connected in series for storing the pixel signals, and is arranged to forward the pixel signals from cell to cell, the distributing device is arranged to deliver the pixel signals successively to first cells of the respective second store and forward devices, and the plurality of the second store and forward devices and the one distributing device are arranged to acquire the pixel signals each corresponding to one pixel, the pixel signals stored in all the cells of the second store and forward devices being forwarded all at once each time the pixel signals delivered from the distributing device to the second store and forward devices have been stored in all the first cells.

With this construction, the distributing device successively delivers the pixel signals to the plurality of second store and forward devices to store the pixel signals in the first cells thereof. Each second store and forward device forwards, cell by cell, the pixel signals stored in the cells. The pixel signals each corresponding to one pixel are acquired by the one distributing device and the plurality of second store and forward devices in addition to the plurality of photoelectric conversion devices, the plurality of second signal fetch devices and the one collecting device. Each time the pixel signals have been stored in all the first cells, the pixel signals stored in all the cells of the second store and forward devices are forwarded all at once.

Thus, the signal forwarding cycle of the second store and forward devices corresponds to the delivery cycle of the distributing device multiplied by the number of (two or more) second store and forward devices connected to the distributing device. The delivery cycle of the distributing device corresponds to the photographing cycle. It is therefore possible to make the forwarding cycle of the second store and forward devices long compared with (i.e. at least twice) the photographing speed. Therefore, even in high-speed photography, the transfer rate of the second store and forward devices may be made a relatively low speed to reduce the generation of heat due to clocking. The parallel arrangement of the plurality of second store and forward devices in the image information detecting unit has an excellent efficiency of using space, to allow for an increased open area ratio (fill factor).

In one example of the above construction according to the invention, the optical image information detecting apparatus includes a plurality of image information detecting units arranged along array lines, each of the image information detecting units having the photoelectric conversion devices, the second signal fetch devices, and the collecting device.

The problem (II) above is solved, according to this invention, by another optical image information detecting apparatus having photoelectric conversion devices for generating electric signals according to intensities of incident light, comprising:

second signal fetch device provided for the photoelectric conversion devices for fetching the electric signals generated in the photoelectric conversion devices;

a collecting and distributing device for receiving the electric signals from the plurality of second signal fetch devices, and generating a pixel signal integrating the electric signals; and a plurality of second store and forward devices for receiving the pixel signals from the collecting and distributing device, and forwarding the pixel signals;

wherein each of the second store and forward devices includes a plurality of cells connected in series for storing the pixel signals, and is arranged to forward the pixel signals from cell to cell;

the collecting and distributing device is arranged to deliver the pixel signals successively to first cells of the respective second store and forward devices;

the plurality of photoelectric conversion devices and the plurality of signal fetch devices, the one collecting and distributing device and the plurality of second store and forward devices are arranged to acquire the pixel signals each corresponding to one pixel; and the pixel signals stored in all the cells of the second store and forward devices are forwarded all at once each time the pixel signals delivered from the collecting and distributing device to the second store and forward devices have been stored in all the first cells.

With this (latter) optical image information detecting apparatus according to this invention devised to solve the problem (II) noted hereinbefore, the collecting and distributing device can collect the electric signals from the second signal fetch devices to form pixel signals, and deliver the pixel signals successively to the first cells of the respective second store and forward devices. That is, this apparatus realizes the functions of the collecting device and distributing device of the former apparatus according to the invention devised to solve the problem (II) noted hereinbefore. Such collecting and distributing device, while simplifying the construction, realizes the functions and effects of the former apparatus according to the invention having the functions of the collecting device and distributing device.

In one example of the above construction according to the invention, the optical image information detecting apparatus includes a plurality of image information detecting units arranged along array lines, each of the image information detecting units having the photoelectric conversion devices, the second signal fetch devices, the collecting and distributing device, and the second store and forward devices.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Preferred embodiments of this invention will be described in detail hereinafter with reference to the drawings.

First Embodiment

Figure 1:
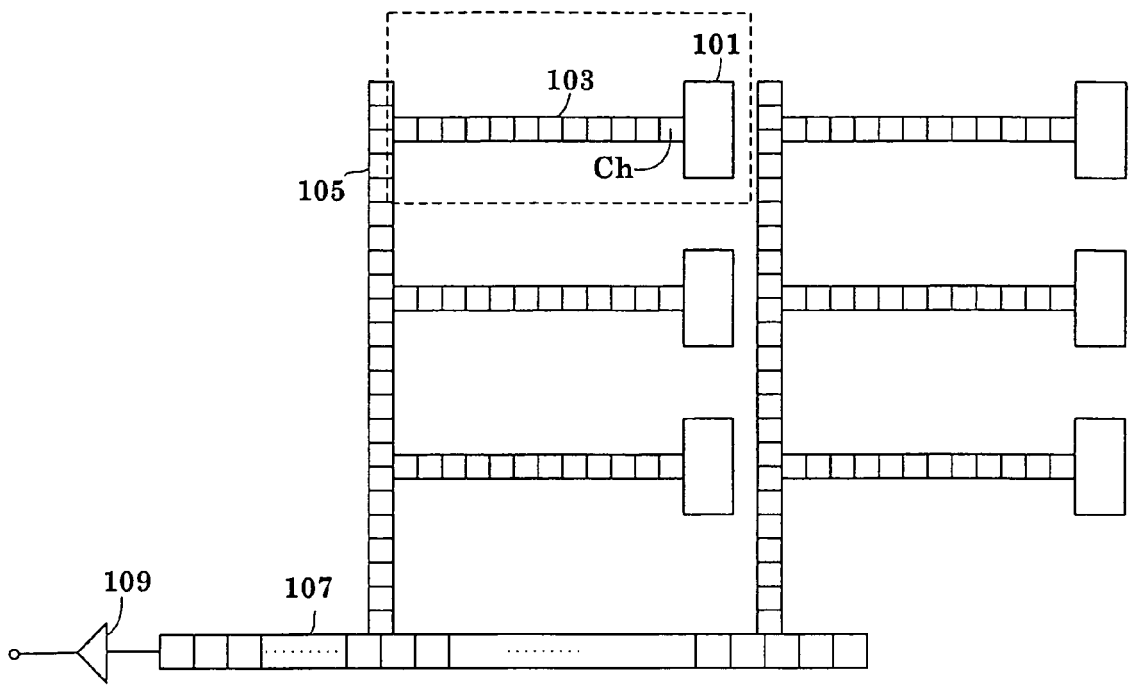
FIG. 1 is a schematic view showing an image sensor used in a conventional high-speed photographic apparatus.
Figure 2:
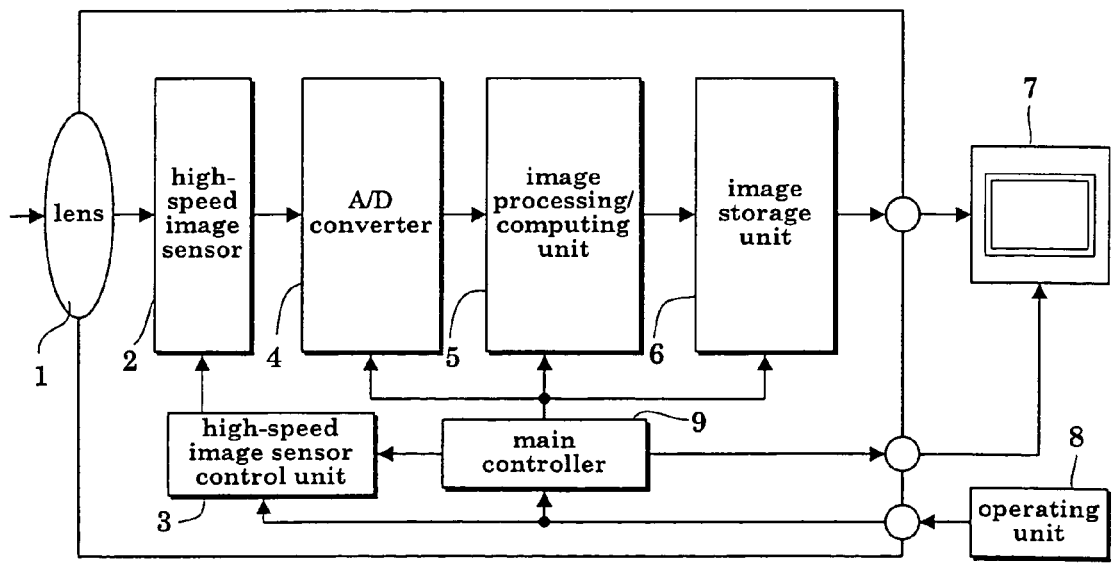
FIG. 2 is a block diagram showing an overall construction of a high-speed photographic apparatus employing high-speed image sensors in a first to a third embodiments.
Figure 3:
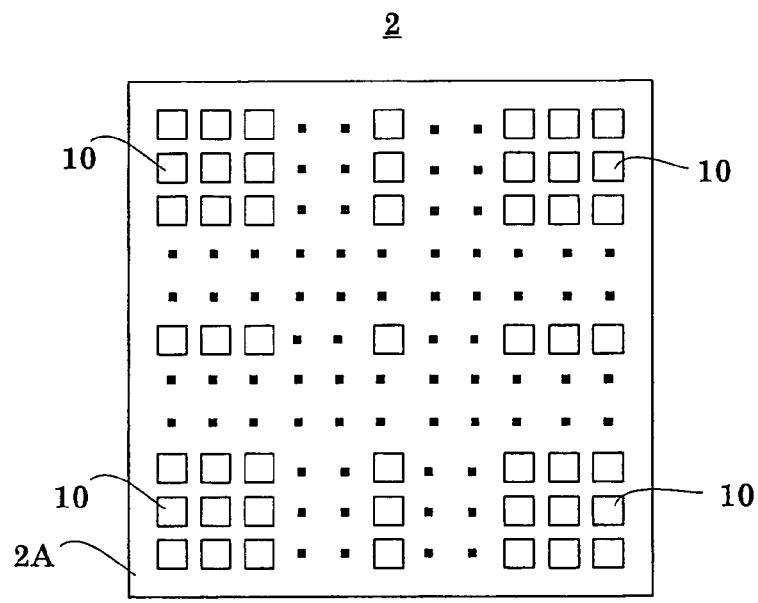
FIG. 3 is an explanatory view showing an arrangement of image information detecting units of the high-speed image sensors in the first to third embodiments.
Figure 4:
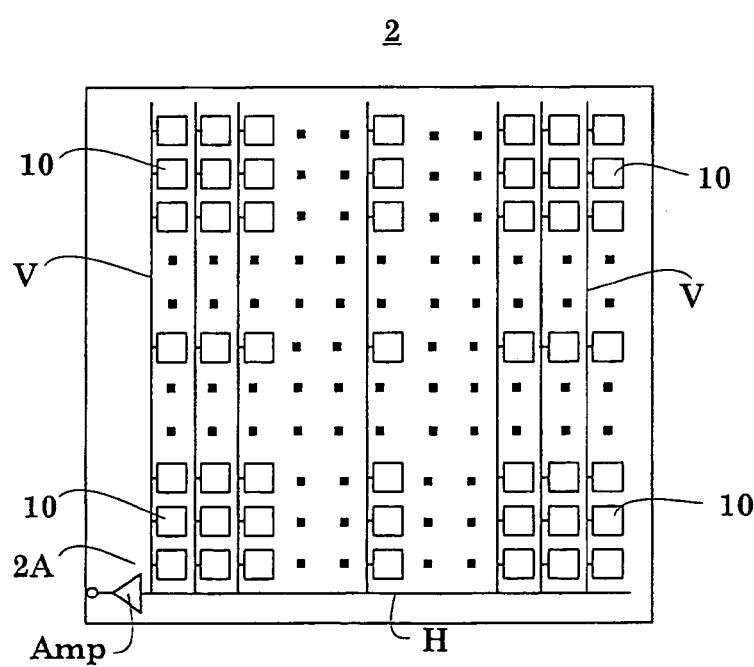
FIG. 4 is an explanatory view showing the arrangement of the image information detecting units, with vertical and horizontal transfer lines, of the high-speed image sensors in the first to third embodiments.

A high-speed image sensor, in a first embodiment, of an optical image information detecting apparatus according to this invention will be described with reference to the drawings. FIG. 2 is a block diagram showing an overall construction of the high-speed photographic apparatus using the high-speed image sensor in the first embodiment. FIGS. 2, 3 and 4 serve as common figures illustrating also a second and a third embodiments.

The high-speed photographic apparatus (high-speed video camera) shown in FIG. 2 is capable of photographing subjects (e.g. an explosion, destruction, combustion and so on) at a high speed of one frame per microsecond (i.e. one million frames per second), and displaying two-dimensional images of such high-speed phenomena. This apparatus is for use in scientific measurement, for example.

The high-speed photographic apparatus shown in FIG. 2 includes an optical system 1, a high-speed image sensor 2, a high-speed image sensor control unit 3, an analog-to-digital converter 4, an image processing and computing unit 5, an image storage unit 6, an image display monitor 7, an operating unit 8 and a main controller 9.

The optical system 1 typically is a lens. This lens takes in optical images of a photographic subject (not shown) via a light multiplying mechanism such as a high-sensitivity image intensifier provided as necessary (not shown) and a shuttering mechanism (not shown).

The high-speed image sensor 2 picks up the optical images taken in by the optical system 1, and obtains two-dimensional image information (two-dimensional optical image information). The high-speed image sensor control unit 3 controls electronic shuttering cycles (electronic exposure cycles) and the like of the high-speed image sensor 2.

The analog-to-digital converter 4 converts electric signals outputted from the high-speed image sensor 2 into digital signals. The image processing and computing unit 5 edits and creates two-dimensional images of the photographic subject from the digitized electric signals.

The image storage unit 6 stores the two-dimensional images created by the image processing and computing unit 5. The image display monitor 7 displays on the screen the two-dimensional images stored in the image storage unit 6. The operating unit 8 performs various operations required for high-speed photography. The main controller 9 controls operation and progress of the entire apparatus according to photographic conditions set by the operating unit 8.

The high-speed image sensor 2 in the first embodiment has a detecting surface 2A, as shown in FIG. 3, for detecting optical images taken in by the optical system 1. The detecting surface 2A includes image information detecting units 10, which are 80,000 in number, for example, and are arranged longitudinally and transversely along two-dimensional array lines in matrix form. In the high-speed image sensor 2, in principle, one image information detecting unit 10 detects image information corresponding to one pixel in a two-dimensional image. The image information detecting units 10 correspond to the image information detecting units in this invention.

As shown in FIG. 4, a vertical transfer line V is connected to each of the image information detecting units 10 arranged longitudinally, for transferring stored electric signals in a vertical (longitudinal) direction. The vertical transfer lines V arranged transversely are connected to a horizontal transfer line H which transfers the electric signals in a horizontal (transverse) direction. Each vertical transfer line V includes a plurality of vertical transfer cells.

Figure 5:
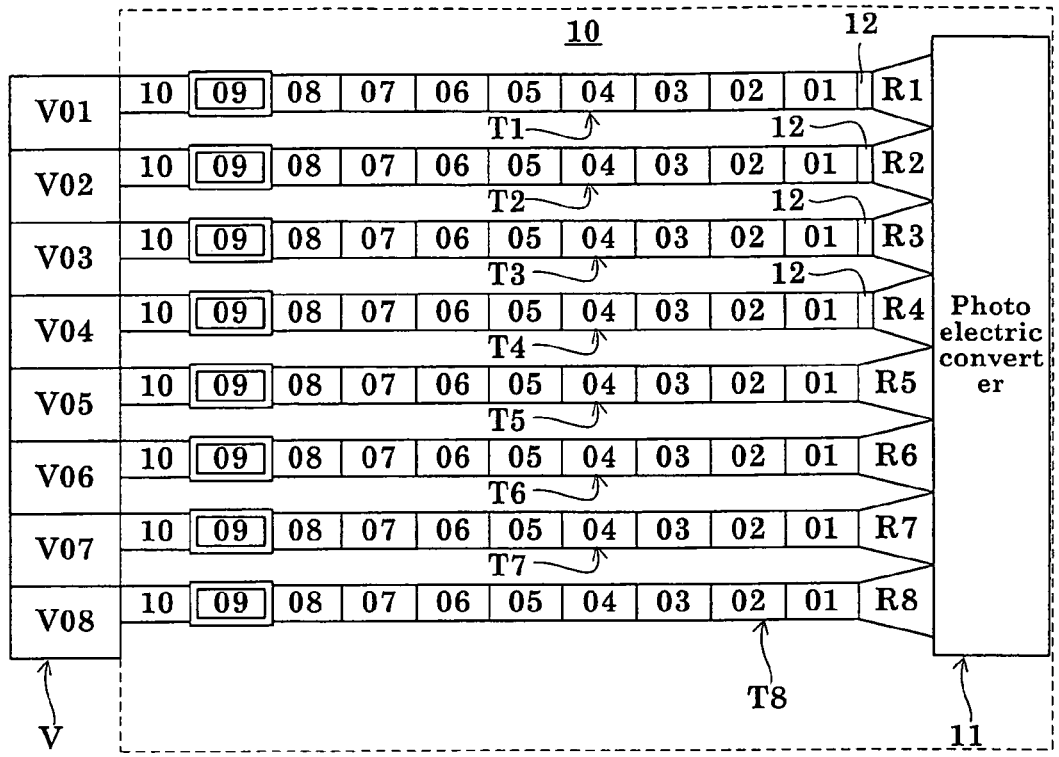
FIG. 5 is a block diagram showing a construction of an image information detecting unit in the first embodiment.

As shown in FIG. 5, each image information detecting unit 10 has one photoelectric converter 11, signal fetch gates R1-R8, M in number (which is assumed eight, for expediency), and eight store and forward lines T1-T8. The photoelectric converter 11 corresponds to the photoelectric conversion device in this invention. The signal fetch gates R1-R8 correspond to the first signal fetch devices in this invention.

The store and forward lines T1-T8 correspond to the first store and forward devices in this invention.

The photoelectric converter 11 generates electric signals as electric charges according to intensities of incident light having optical image information of a high-speed phenomenon. The photoelectric converter 11 may be a photoelectric conversion device such as a photodiode, for example.

The signal fetch gates R1-R8 fetch the electric signals generated in the photoelectric converter 11 in each electronic shuttering cycle. Each of the store and forward lines T1-T8 includes store and forward cells C01-C10, N in number (which is assumed ten, for expediency), connected in series (serially). The store and forward lines T1-T8 receive and forward the electric signals fetched by the signal fetch gates R1-R8 as electric charges.

The signal fetch gates R1-R8 are connected in parallel with one another to the one photoelectric converter 11. The store and forward lines T1-T8 are connected to the signal fetch gates R1-R8, respectively, in a one-to-one relationship. The signal fetch gates R1-R8 repeatedly fetch the electric signals in a predetermined order. Each preceding electric signal delivered from each of the signal fetch gates R1-R8 is passed on from one to the next of the store and forward cells C01-C10 of each of the store and forward lines T1-T8 by the time a next electric signal is received.

In each of the store and forward lines T1-T8, an electric signal delivered from one of the signal fetch gates R1-R8 is forwarded from one to the next of the store and forward cells C01-C10 by charge transfer signals applied synchronously with electronic shuttering operations to transfer electrode lines (not shown) disposed on surfaces of the store and forward cells C01-C10. In the first embodiment, the transfer among the store and forward cells C01-C10 is carried out in a four-phase drive mode. That is, the store and forward lines T1-T8 are CCDs (Charge Coupled Devices) of four-phase drive mode. In FIG. 5, the store and forward cells C01-C10 are indicated by numerals 01-10 without "C."

Figure 6:
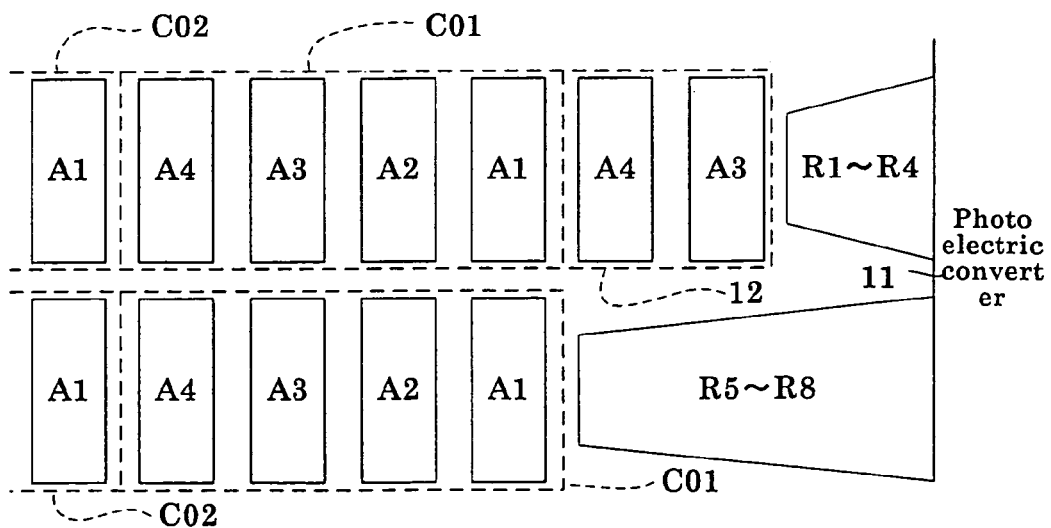
FIG. 6 is a schematic view showing buffer cells in the image information detecting unit of the high-speed image sensor in the first embodiment.

The store and forward cells C09 serve also as drain elements for directly discharging electric signals received, instead of forwarding them to the next store and forward cells C10, while an overwrite command is given. When no overwrite command is given, the store and forward cells C09 forward the electric signals to the next store and forward cells C10.

Where the electric signals are transferred in the four-phase drive mode, timing of fetching the electric signals by the signal fetch gates R1-R4, as described in detail hereinafter, coincides with a signal non-acceptance time of the store and forward cells C01, which receive the electric signals first, of the store and forward lines T1-T4. Thus, as shown in FIG. 6, buffer cells 12 are disposed between the signal fetch gates R1-R4 and the store and forward cells C01 for temporarily holding the electric signals. The buffer cells 12 temporarily hold the electric signals transmitted from the signal fetch gates R1-R4, until a shift to the signal acceptance time. The buffer cells 12 correspond to the temporary signal holding devices in this invention.

Figure 7:
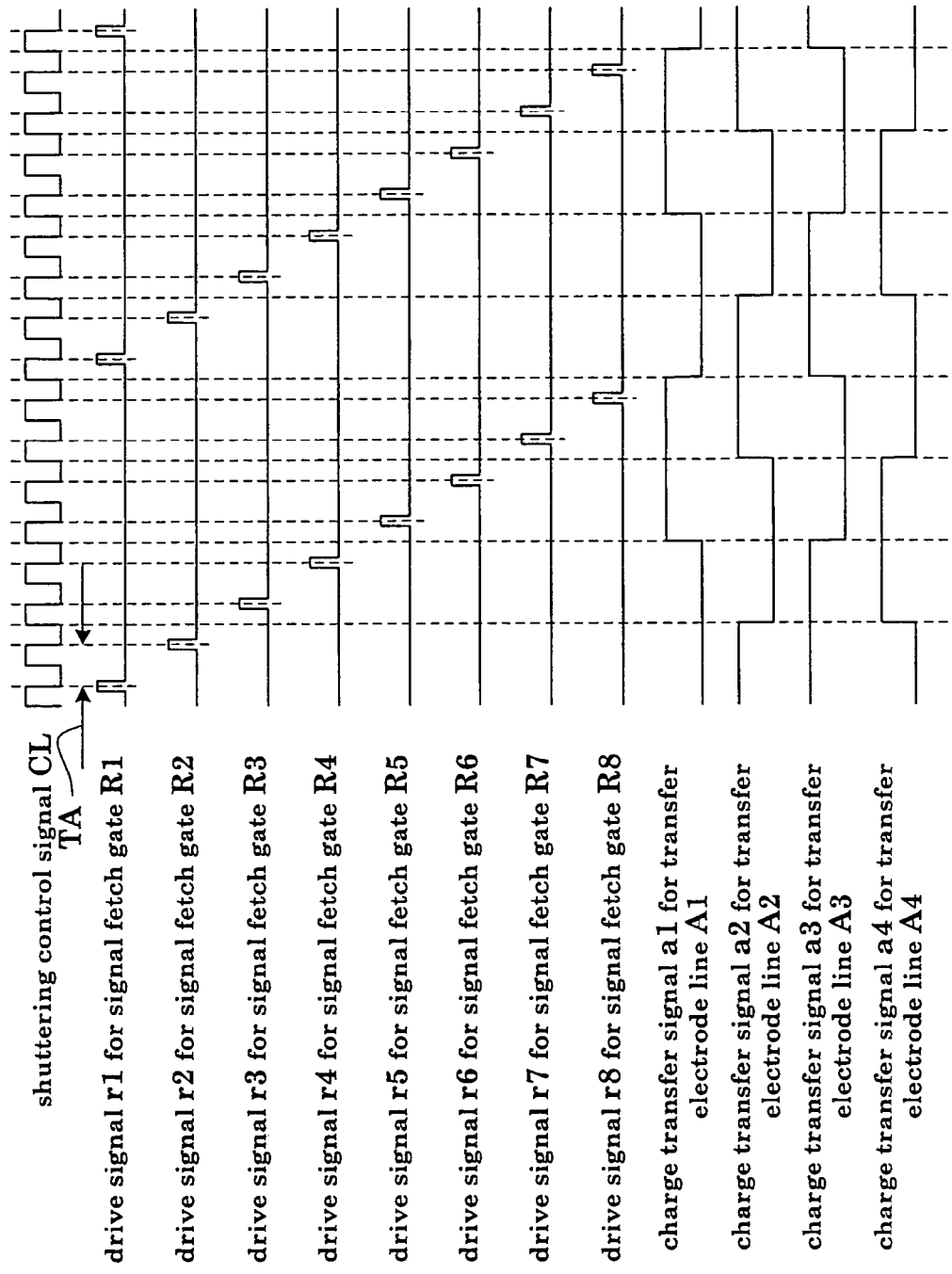
FIG. 7 is a graph showing various signals required for driving the high-speed image sensor in the first embodiment.

Next, an operation of each image information detecting unit 10 of the high-speed image sensor 2 in the first embodiment for detecting two-dimensional image information will be described with reference to the drawings. FIG. 7 is a graph showing various signals required for driving the high-speed image sensor 2. The signals required for driving the sensor 2 herein include a shuttering control signal CL for controlling electronic shuttering cycles (electronic exposure cycles) TA of the high-speed image sensor 2, gate drive signals r1-r8 for controlling the electric signal fetch timing of the signal fetch gates R1-R8, and charge transfer signals a1-a4 for electric signal transfer applied to electrode lines A1-A4 for transfer among the store and forward cells C01-C10 and to electrode lines A3 and A4 for transfer from the buffer cells 12. FIG. 7 shows a graph of these signals for comparison.

The photoelectric converter 11 generates electric signals according to intensities of incident light having optical image information of a high-speed phenomenon. In response to eight gate drive signals r1-r8 shown as the second to ninth signals counted from top in FIG. 7, the eight signal fetch gates R1-R8 successively fetch the electric signals from the photoelectric converter 11 with time lags of electronic shuttering cycles TA, and deliver the signals to the respective store and forward lines T1-T8.

In response to charge transfer signals a1-a4 shown as the four lowermost signals in FIG. 7, the electric signals delivered earlier to each of the store and forward lines T1-T8 are forwarded each from one to the next of the store and forward cells C01-C10 by the time a next electric signal is delivered. Specifically, the electric signals are forwarded through the store and forward cells C01-C10 in cycles substantially eight times as long as the electronic shuttering cycles TA.

Thus, one electronic shuttering operation is carried out for the high-speed image sensor 2 whenever each of the signal fetch gates R1-R8 fetches an electric signal. As a result, eight electronic shuttering operations take place during one forwarding time (i.e. during one signal forwarding cycle) of the store and forward cells C01-C10. That is, one electronic shuttering cycle TA is one eighth (⅛) in length of the signal forwarding cycle of the store and forward lines T1-T8.

With the store and forward lines T1-T8 which forward the electric signals in the four-phase drive mode, and with the arrangement of transfer electrode lines A1-A4 shown in FIG. 6, the charge transfer signal a1 applied to the transfer electrode line A1 results in the signal fetch timing of the signal fetch gates R1-R4 coinciding with the signal non-acceptance time of the store and forward cells C01. Therefore, until the polarity of signal a1 for the transfer electrode line A1 is reversed to render the store and forward cells C01 ready for accepting signals, the buffer cells 12 also having the transfer electrode lines A3 and A4 temporarily hold the electric signals. Consequently, even if a discrepancy in time occurs between the fetching of the electric signals by the signal fetch gates R1-R4 and acceptance of the electric signals by the store and forward cells C01, the electric signals may be fetched and delivered easily and smoothly.

With the high-speed image sensor 2 in the first embodiment, as electronic shuttering takes place 80 times, electric signals as two-dimensional image information are stored in all of the 80 store and forward cells C01-C10 of each image information detecting unit 10. When electric signals have been stored in all of the store and forward cells C01-C10, the electronic shuttering is stopped, and the electric signals stored in the store and forward cells C01-C10 are outputted successively from the image information detecting units 10 of the high-speed image sensor 2 to the analog-to-digital converter 4 through vertical transfer cells V01-V08 (FIG. 4) forming the vertical transfer lines V, the horizontal transfer line H (FIG. 4) connected to the vertical transfer lines V and an amplifier Amp (FIG. 4).

In the high-speed photographic apparatus shown in FIG. 2, the electric signals digitized by the analog-to-digital converter 4 are sent to the image processing and computing unit 5 which edits and creates one two-dimensional image from each group of electric signals of the image information detecting units 10 obtained from the same electronic shuttering operation. Such images are stored in the image storage unit 6. The two-dimensional images may be read from the image storage unit 6 at any time by an input made to the operating unit 8, to be displayed at a suitable display speed on the screen of image display monitor 7 for observation.

The electronic shuttering cycles of the high-speed image sensor 2 may be changed by using the operating unit 8. The high-speed image sensor control unit 3 supplies a shuttering control signal corresponding to a selected electronic shuttering cycle to the high-speed image sensor 2.

The high-speed photographic apparatus of FIG. 2 is constructed to receive a trigger signal from outside reporting the occurrence of a high-speed phenomenon. The high-speed image sensor control unit 3 normally performs photography in long electronic shuttering cycles, and continues an overwrite mode by discharging the electric signals directly from the store and forward cells C09. Upon receipt of a trigger signal at the occurrence of a high-speed phenomenon to be photographed, the overwrite mode is stopped in favor of high-speed photography.

The first embodiment solves the problem (I).

As described above, each image information detecting unit 10 of the high-speed image sensor 2 in the first embodiment has the store and forward lines T1-T8, which store and forward electric signals, connected as separated from one another, respectively, to the eight signal fetch gates R1-R8 which fetch the electric signals from the one photoelectric converter 11 at every electronic shuttering operation. The electric signals are transmitted, one after another, from the signal fetch gates R1-R8 to the first cells C01 of the respective store and forward lines T1-T8 in the electronic shuttering cycles. The store and forward lines T1-T8 forward the electric signals in the signal forwarding cycles eight times the electronic shuttering cycles. With this signal forwarding, each image information detecting unit 10 can fetch and forward eight electric signals in each signal forwarding cycle of the store and forward lines. Thus, two-dimensional image information on a high-speed phenomenon may be obtained at a rate of one eighth of, i.e. eight times as fast as, the signal forwarding cycle. That is, the photographing speed is not restrained by the transfer speed, but may be made eight times the latter.

In the high-speed image sensor 2 in the first embodiment, the number M of the signal fetch gates in each image information detecting unit 10, preferably, is in a range of five to 15. The number N of the store and forward cells, preferably, is in a range of five to 15 also. In this case, high-speed photography may be performed at a rate of 5 to 15 times the signal transfer rate of the store and forward cells.

With settings made in the above range, the signal forwarding cycles of the store and forward lines T1-T8 may be made as slow as five to 15 times the electronic shuttering cycles of the photoelectric converter 11. The number M of the signal fetch gates (first signal fetch devices) less than five would produce only an insufficient effect of reducing power consumption accompanying clocking, and tends to hamper improvement in photographing speed in relation to the transfer rate. Where the number M is 16 or more, the signal fetch gates would be too small relative to the photoelectric converter 11, which tends to impair the promptness of signal fetching.

The number N of the cells in each store and forward line (first store and forward device) less than five would be capable of storing only a small amount of information, thereby tending to produce a dynamic image of insufficient length. Where the number N is 16 or more, the photoelectric converter 11 would occupy a reduced area in each image information detecting unit, tending to lower the open area ratio (fill factor).

Second Embodiment

A high-speed image sensor, in the second embodiment, of the optical image information detecting apparatus according to this invention will be described with reference to the drawings. The second embodiment is illustrated in FIGS. 2 through 4 showing views common to the first and third embodiments. Thus, no particular description will be made concerning the arrangement of the high-speed photographic apparatus or the image information detecting units 10 of the high-speed image sensor.

Figure 8:
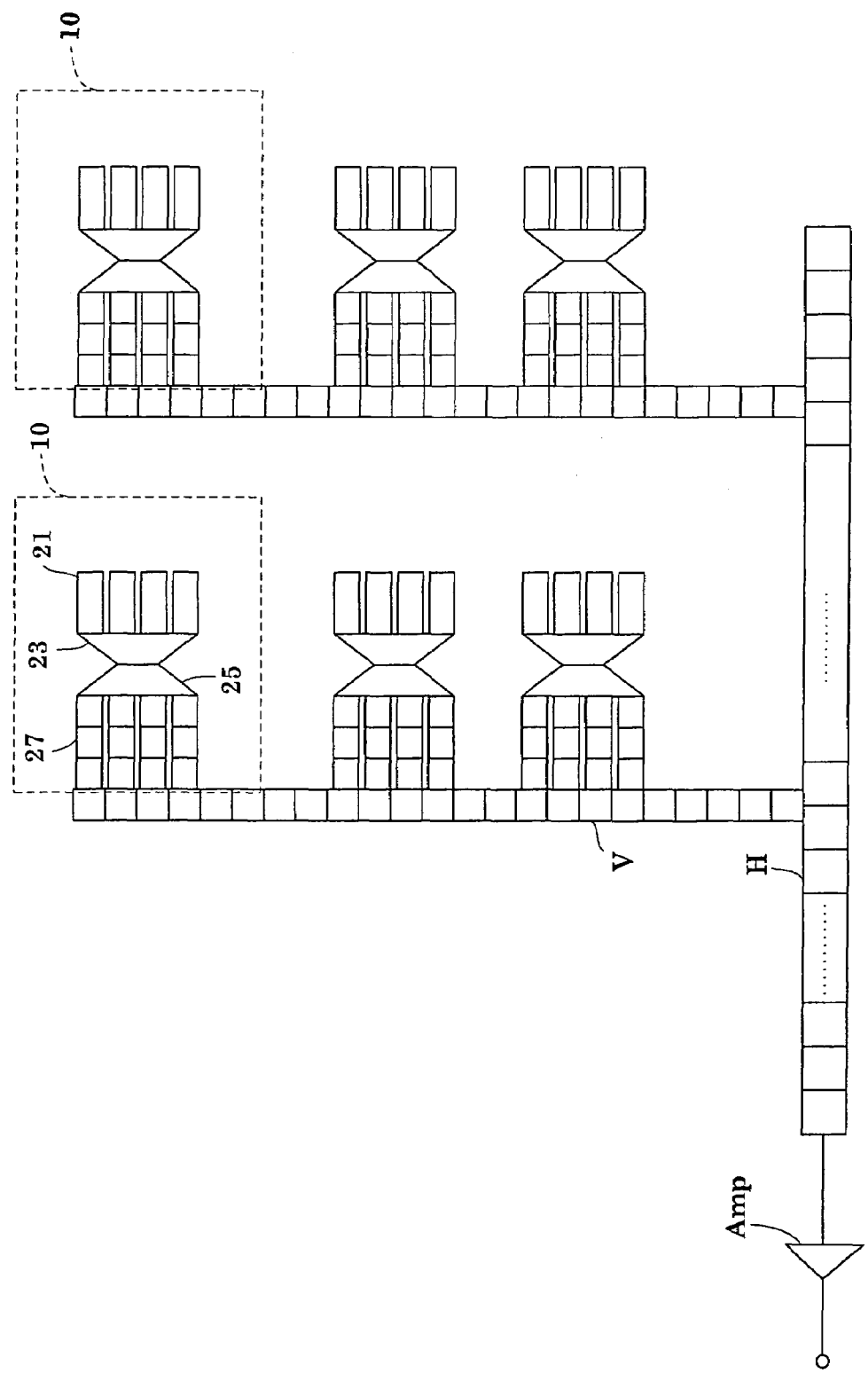
FIG. 8 is a schematic view of the high-speed image sensor in the second embodiment.

As shown in FIG. 8, each image information detecting unit 10 in the second embodiment includes a plurality of photoelectric converters 21, a plurality of store and forward lines 27, and a collector 23 and a distributor 25 arranged between the photoelectric converters 21 and the store and forward lines 27. The image information detecting unit 10 will be described in detail with reference to FIG. 9. The image information detecting units 10 in the second embodiment correspond to the image information detecting units in this invention.

Figure 9:
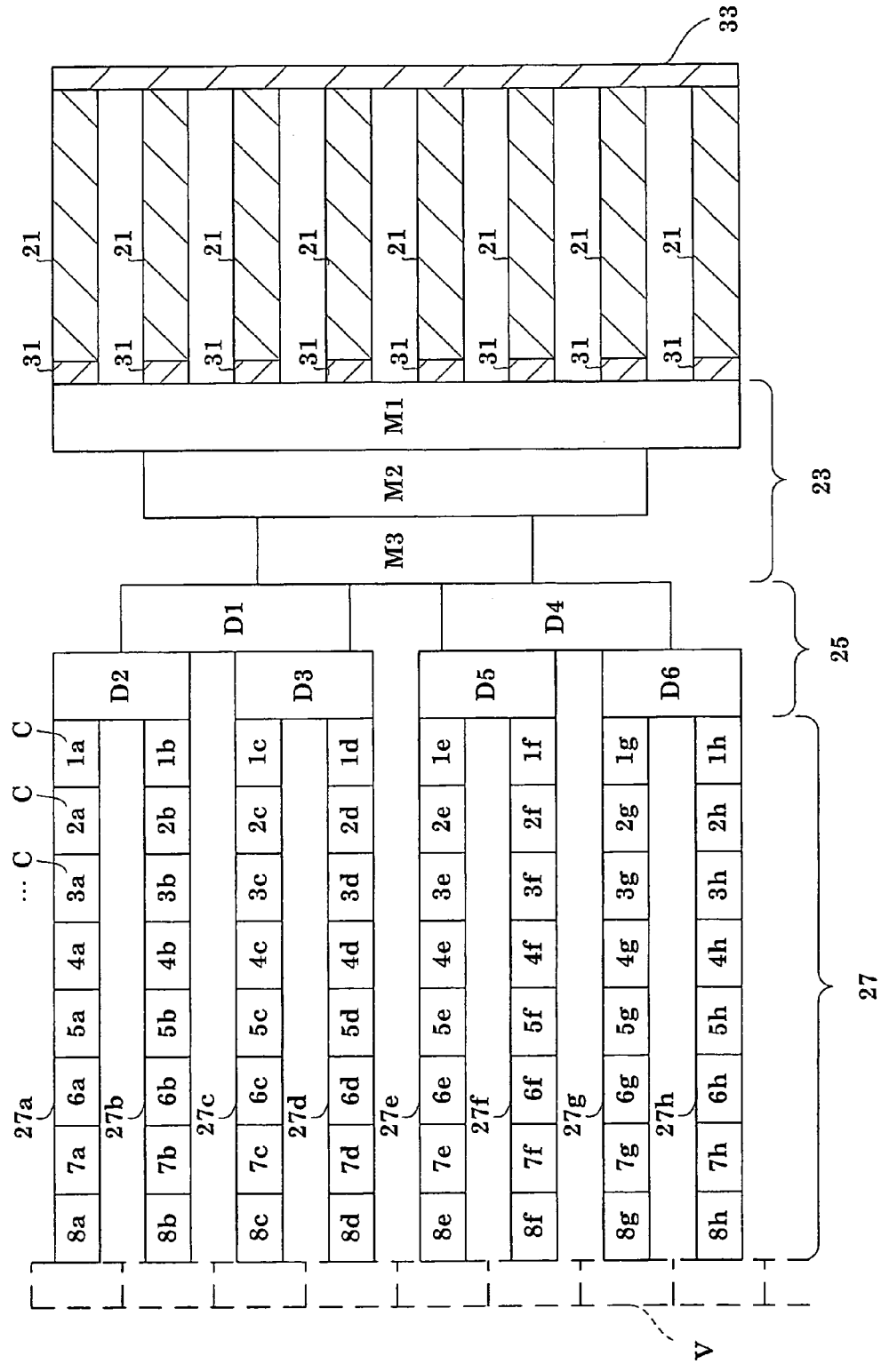
FIG. 9 is a view showing an overall construction of an image information detecting unit in the second embodiment.

As shown in FIG. 9, the image information detecting unit 10 has eight photoelectric converters 21, eight signal fetch gates 31 provided for the respective photoelectric converters 21, one collector 23 connected to the signal fetch gates 31, one distributor 25 connected to the collector 23, and eight store and forward lines 27 connected to the distributor 25. A common drain 33 is provided for the eight photoelectric converters 21.

As in the first embodiment, the photoelectric converters 21 may be photoelectric conversion devices such as photodiodes, for example.

Each photoelectric converter 21 corresponds to an eighth part of a photoelectric converter of large area used in a conventional high-speed image sensor, and thus has a smaller area than the conventional photoelectric converter. It is therefore possible to carry on-chip microlenses to realize an improved open area ratio. The photoelectric converters 21 correspond to the photoelectric conversion devices in this invention.

The signal fetch gates 31 are provided for the respective photoelectric converters 21 to read and fetch electric signals from the photoelectric converters 21. The signal fetch gates 31 have electrodes, not shown, arranged thereon, and potential gradients are formed by applying voltage to the electrodes to read the electric signals from the photoelectric converters 21. The signal fetch gates 31 correspond to the second signal fetch devices.

The collector 23 receives and collects the electric signals from the eight signal fetch gates 31. The electric signals collected are pixel signals as noted hereinbefore. The collector 23 includes three cells M1-M3 formed of CCDs. As shown in FIG. 9, the cell M1 that directly receives the electric signal from each signal fetch gate 31 is the largest. The cells M2 and M3 are progressively smaller in size toward the cells constituting the store and forward lines 27. With this construction, pixel signals may be acquired by collecting the electric signals as they are transferred. A reduction in the transfer rate of the pixel signals is avoided by gradually diminishing a spatial expanse of the cells of the collector 23. The collector 23 corresponds to the collecting device in this invention.

The distributor 25 is connected to the collector 23, and successively delivers the pixel signals received from the collector 23 to the first cells of the store and forward lines 17 described hereinafter. The distributor 25 includes six cells D1-D6 also formed of CCDs. However, each of the cells D1-D6 is connected for transferring the pixel signals selectively to two cells arranged adjacent thereto in the direction of transfer. That is, the distributor 25 has a construction similar to a matrix type switch of 1×8 to select paths for transferring the pixel signals.

Specifically, the cells D1-D6 are controlled by applying voltage to electrodes, not shown, arranged thereon. The cells are set to an ON state for receiving the pixel signals when the voltage is applied to form a potential gradient. Conversely, the cells having the potential gradient are turned to an OFF state by applying no voltage, so that the pixel signals are not received. When, for example, the cell D2 is set to the ON state and the cell D3 to the OFF state, the pixel signals stored in the cell D1 are transferred to the cell D2. By forming a potential gradient over two adjacent cells in this way, a path may be selected for transferring the pixel signals.

Thus, the distributor 25 delivers the pixel signals, in turn, to the eight store and forward lines 27. The distributor 25 corresponds to the distributing device in this invention.

Each store and forward line 27 includes a plurality of (eight in the second embodiment) (store and forward) cells C formed of CCDs and connected in series. One image information detecting unit 10 has a plurality of (eight in the second embodiment) such store and forward lines 27 connected parallel with one another to the distributor 25. For distinguishment, the store and forward lines 27 will be referred to, as necessary hereinafter, as "17a, 17b and so on" in order from top to bottom, and the cells in the store and forward lines 17a, 17b and so on as "C1a-C8a, C1b-C8b, and so on". In FIG. 9, the cells are referenced without "C". The plurality of store and forward lines 27 provide an increased freedom of arrangement to realize an improvement in space efficiency, and in the open area ratio as well.

The pixel signals delivered by channel selection from the distributor 25 are first stored in the first cells C1a, C1b and so on of the store and forward lines 27. Whenever the pixel signals have been stored in all of the first cells C1a, C1b and so on, the pixel signals stored in all of the cells C of the store and forward lines 27 are transferred all at once.

In the second embodiment, each image information detecting unit 10 includes eight store and forward lines 27 each having eight cells C. Thus, each detecting unit 10 has a capacity for storing a total of 64 pixel signals. The pixel signals stored are collectively transferred from the cells C8a, C8b and so on at the rear ends of the respective store and forward lines 27 to the vertical transfer lines V and horizontal transfer line H (FIG. 8). That is, during a photographic operation for 64 shots, pixel signals are stored in the store and forward lines 27. The pixel signals may be fetched collectively after the photographic operation. Thus, a high-speed photography according to the transfer rate of the store and forward lines 27 may be carried out. The store and forward lines 27 correspond to the second store and forward devices in this invention.

The drain 33 discharges any superfluous electric signals from the photoelectric converters 21. This effectively avoids a blooming phenomenon.

Figure 10A:
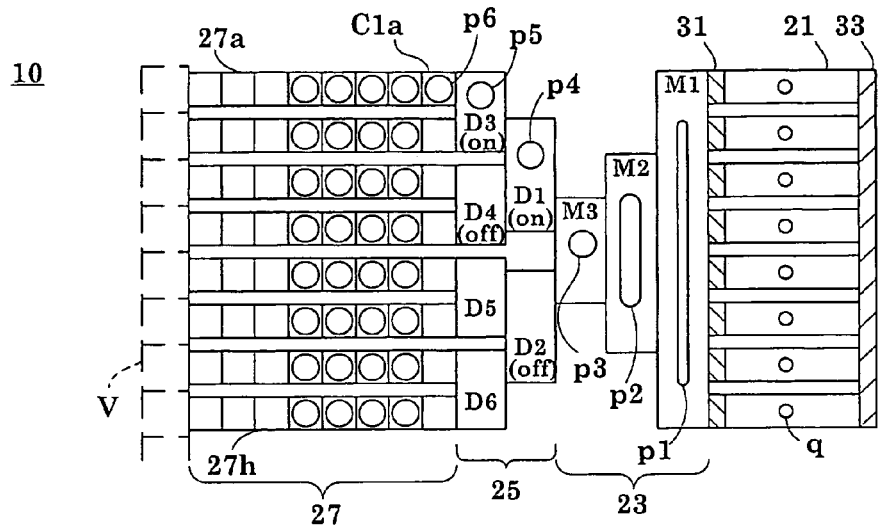
FIG. 10A is a schematic view showing operation in time of photography of the image information detecting unit in the second embodiment.
Figure 10B:
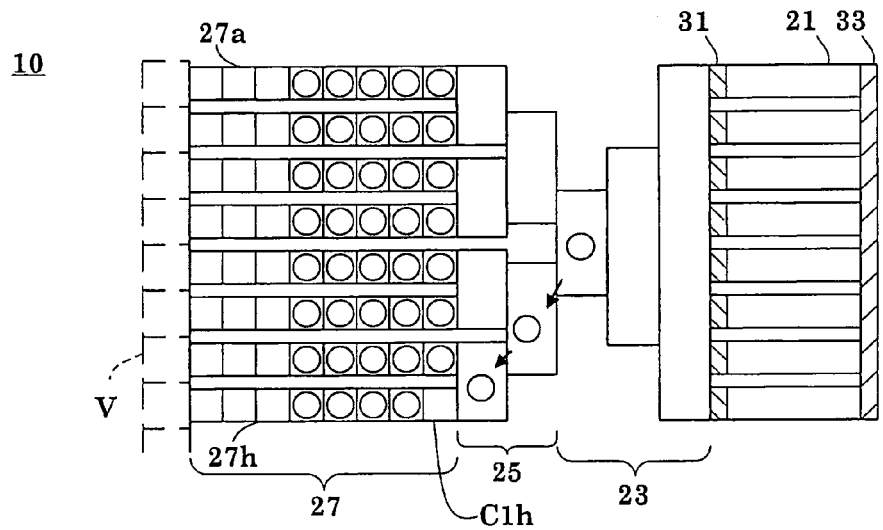
FIG. 10B is a schematic view showing operation in time of photography of the image information detecting unit in the second embodiment.
Figure 10C:
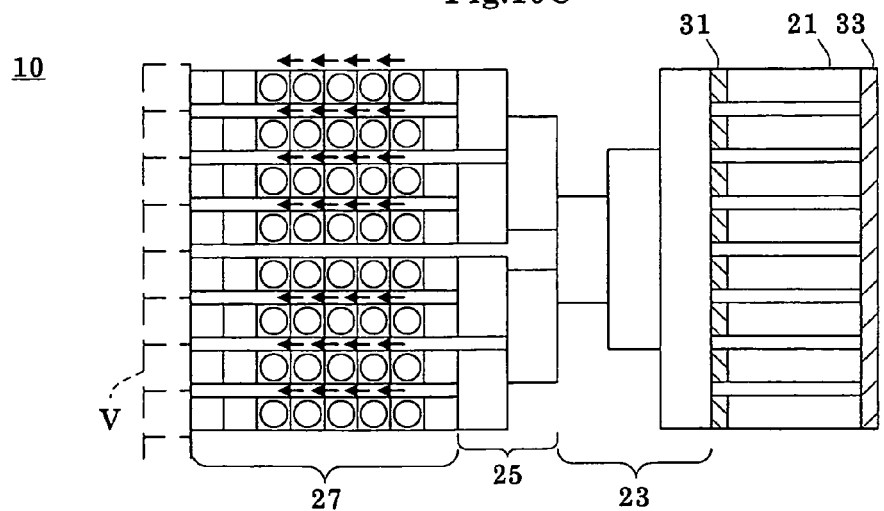
FIG. 10C is a schematic view showing operation in time of photography of the image information detecting unit in the second embodiment.

Next, operation in time of photography of the high-speed image sensor in the second embodiment will be described. FIGS. 10A-10C are schematic views showing operation in time of photography of the image information detecting unit 10 in the second embodiment. These figures schematically show electric signals generated and pixel signals transferred to varied locations. For expediency of description, one photographic operation will be described as divided into an exposure time and a reading (fetching) time.

The second embodiment solves the problem (II).

<Operation of the Signal Fetch Gates 31 and Collector 23>

During an exposure time, each of the eight photoelectric converters 21 carries out a photoelectric conversion of incident light, and generates an electric signal (referenced "q" in FIG. 10A) according to the intensity of the incident light. At a reading time following the exposure time, the eight signal fetch gates 31 fetch and read the electric signals generated. The cell M1 of the collector 23 receives the electric signals read.

Since each photoelectric converter 21 has a smaller area than in the prior art, a potential gradient may be formed easily from each photoelectric converter 21 to the signal fetch gate 31 and the cell M1 of the collector 23. The moving distance of each electric signal being read is not so long as in the prior art. Therefore, the electric signal may be read from each photoelectric converter 21 at high speed, and may be prevented from remaining in the photoelectric converter 21. FIG. 10A shows the electric signals received from the eight signal fetch gates 31 and formed into one pixel signal ("p1") in the cell M1.

A second exposure time begins at the end of the reading time, and each photoelectric converter 21 generates an electric signal ("q") again. At this time, the pixel signal stored in the cell M1 is transferred to the cell M2 ("p2").

Upon start of a second reading time, the electric signals generated during the second exposure time are read by the signal fetch gates 31, and received by the cell M1 to become a pixel signal ("p1").

When a third exposure time begins, the pixel signals stored in the cell M1 and cell M2 are transferred to the cell M2 and cell M3 ("p2", "p3"), respectively.

The area becomes gradually smaller from cell M1 to cell M3, and so does the spatial expanse. This feature is effective to prevent a reduction in the transfer rate of pixel signals.

<Operation of the Distributor 25>

As described above, synchronously with the timing of photography in which the exposure time and reading time are repeated, electric signals are generated repeatedly, and successively formed into pixel signals to be transferred from cell to cell. The following description will be made, with reference to FIG. 10A, concerning only the transfer of the pixel signals stored in the cell M3 carried out in timed relationship with photography, for delivery to the store and forward lines 27.

First, the cell D1 of the distributor 25 is set to the ON state, and the cell D2 to the OFF state, thereby forming a potential gradient from the cell M3 of the collector 23 to the cell D1 of the distributor 25. As a result, the pixel signal in the cell M3 is transferred to the cell D1 ("p4").

Next, the cell D3 of the distributor 25 is set to the ON state, and the cell D4 to the OFF state, thereby forming a potential gradient from the cell D1 to the cell D3. As a result, the pixel signal is transferred from the cell D1 to the cell D3 ("p5").

Further, a potential gradient is formed from the cell D3 to the cell C1a by controlling voltage applied to the electrodes of cell C1a of the store and forward line 27a and cell C1b of the store and forward line 27b. As a result, the pixel signal is transferred from the cell D3 to the cell C1a ("p6").

In this way, the distributor 25 delivers the pixel signal to the first cell C1a of the store and forward line 27a. A pixel signal transferred next is delivered to the first cell C1b of the store and forward line 27b. By repeating this operation, the distributor 25 finally delivers a pixel signal to the first cell C1h of store and forward line 27h along the transfer path schematically shown in FIG. 10B.

<Operation of the Store and Forward Lines 27>

As described above, the distributor 25 transfers the pixel signals by channel selection synchronously with the timing of photography. While the distributor 25 delivers the pixel signals to the first cells C1a, C1b and so on of the store and forward lines 27, the store and forward lines 27 take no action to forward the pixel signals. When a pixel signal has been transferred to and stored in the cell C1h, the pixel signals stored in all the cells C of the store and forward lines 27 are forwarded to adjacent cells all at once. This state is shown in FIG. 10C.

Thus, the operation of the store and forward lines 27 may be carried out in cycles 8 times as long as the timing of photography. Even with a high-speed photography, the clocking speed for the electrodes on the cells C of the store and forward lines 27 may be restrained to suppress a heat generation due to power loss.

Third Embodiment

A high-speed image sensor, in the third embodiment, of the optical image information detecting apparatus according to this invention will be described. Like reference signs are used to identify like parts which are the same as in the second embodiment and will not be described again.

Figure 11:
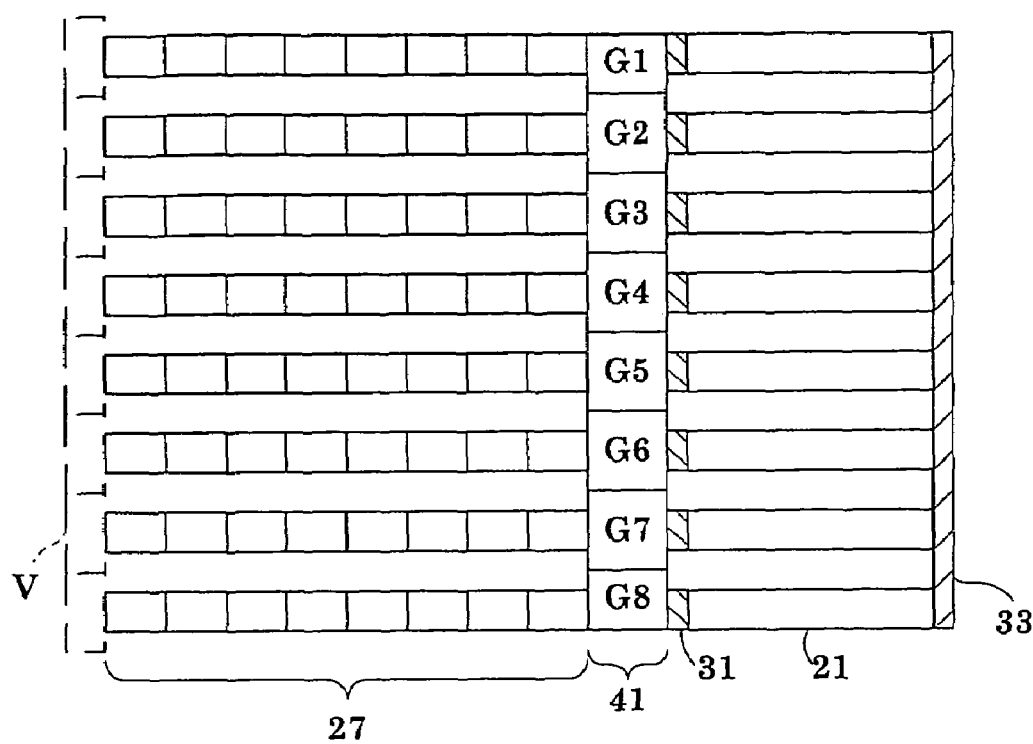
FIG. 11 is a view showing an overall construction of an image information detecting unit in the third embodiment.
Figure 12A:
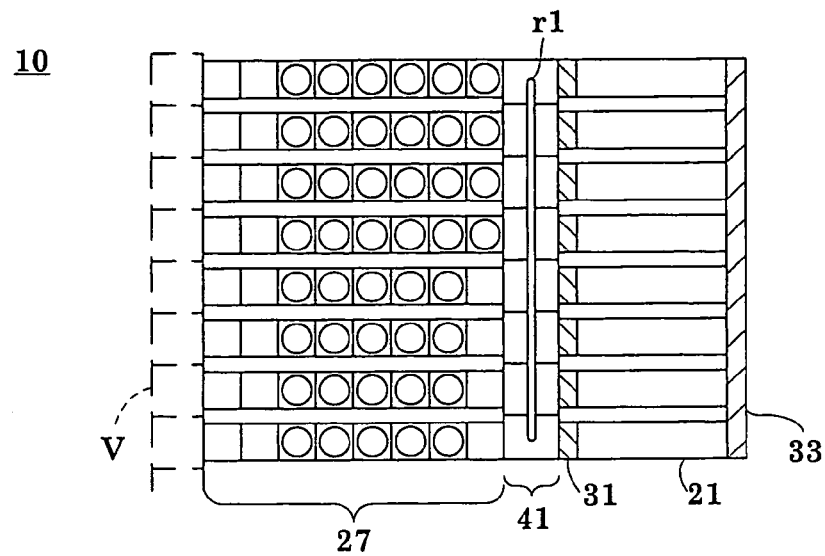
FIG. 12A is a schematic view showing operation in time of photography of the image information detecting unit in the third embodiment.
Figure 12B:
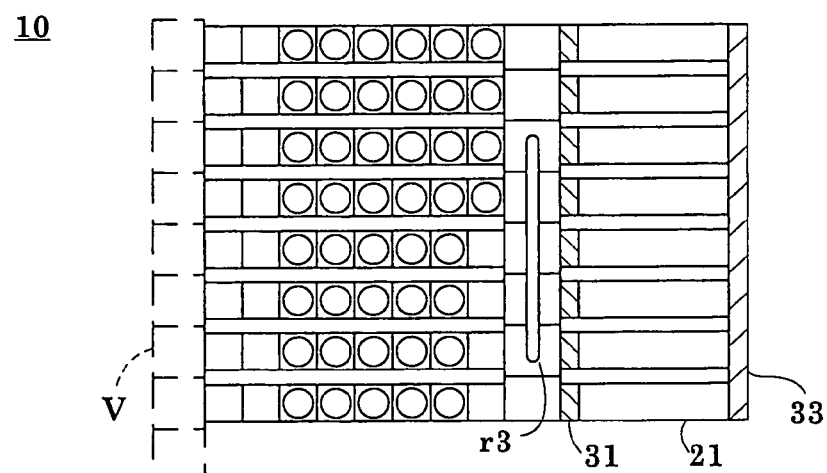
FIG. 12B is a schematic view showing operation in time of photography of the image information detecting unit in the third embodiment.
Figure 12C:
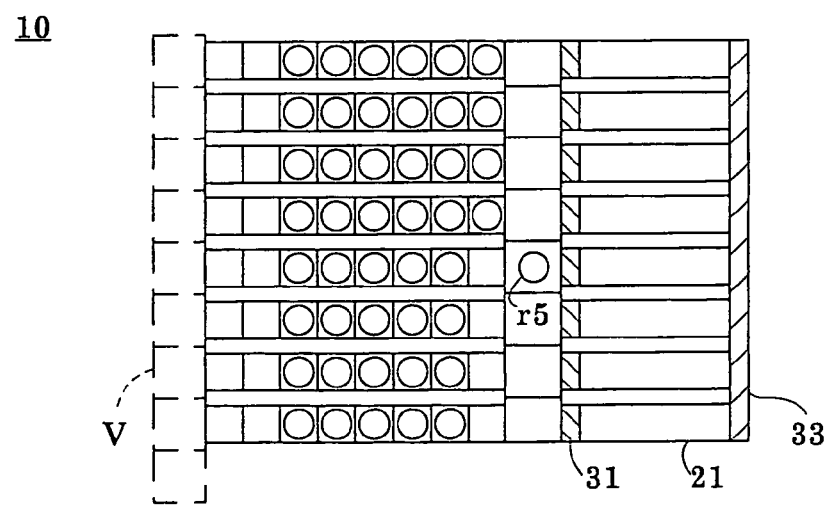
FIG. 12C is a schematic view showing operation in time of photography of the image information detecting unit in the third embodiment.
Figure 13:
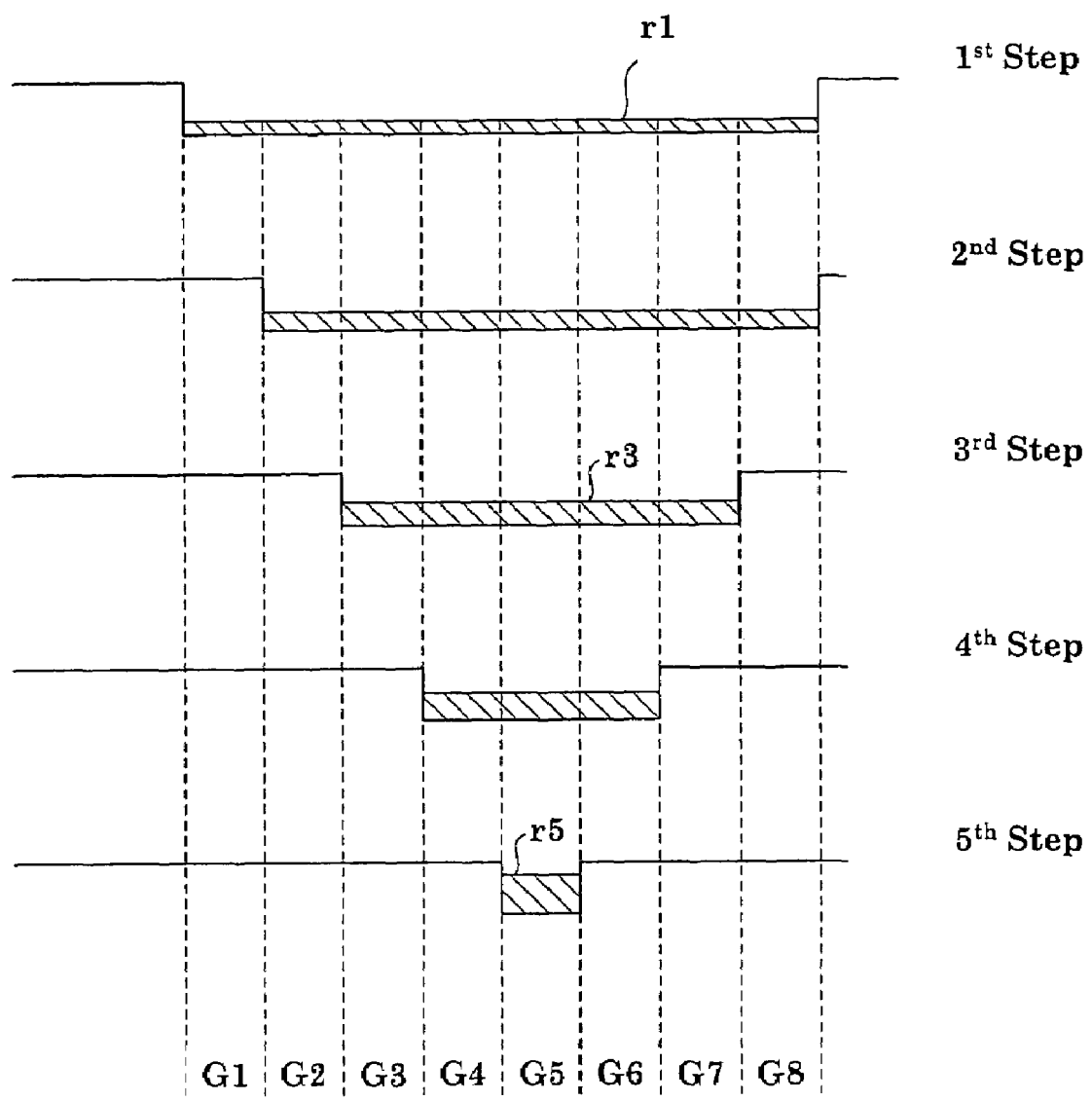
FIG. 13 is a schematic view of potential distributions in a collecting and distributing device in the third embodiment.

FIG. 11 is a view showing an overall construction of an image information detecting unit 10 in the third embodiment. FIGS. 12A through 12C are schematic views showing operation in time of photography of the image information detecting unit 10 in the third embodiment. FIG. 13 is a schematic view of potential distributions of a collector/distributor in the third embodiment.

A collector/distributor 41 shown in FIG. 11 has the functions of the collector 23 and distributor 25 described in the second embodiment. That is, the collector/distributor 41 includes a plurality of (e.g. eight in the third embodiment) cells G1-G8 formed of CCDs. The collector/distributor 41 is connected to a plurality of (eight in the third embodiment) signal fetch gates 31 and a plurality of (eight in the third embodiment) store and forward lines 27. The collector/distributor 41 receives electric signals from the signal fetch gates 31, collects the electric signals into pixel signals, and delivers the pixel signals to first cells of the store and forward lines 27.

Operation of the collector/distributor 41 will be described with reference to FIGS. 12A-12C. The electric signals read by the eight signal fetch gates 31 are received by the collector/distributor 41. At this time, the eight electric signals are integrated into one pixel signal r1. A potential distribution of the collector/distributor 41 at this time is shown in "1st Step" in FIG. 13. In this way, the pixel signal r1 generated from a collection of the electric signals is stored in what is called a potential well formed through the cells G1-G8.

The pixel signal r1 may be delivered to the first cell of the fifth store and forward line 27 counted from top, as follows. First, the cell G1 is set to the OFF state to form a potential gradient from the cell G1 to the cell G2. A pixel signal is now stored between the cells G2-G8 (see "2nd Step" in FIG. 13). Next, the cell G2 and cell G8 are set to the OFF state, to store a pixel signal r3 between the cells G3-G7 (see "3rd Step" in FIG. 13). By repeating this operation, as shown in FIG. 12C, the collector/distributor 41 can store a pixel signal r5 only in the cell G5. A potential distribution at this time becomes as shown in "4th Step" in FIG. 13.

The third embodiment solves the problem (II).

Thus, the collector/distributor 41 can receive electric signals from the signal fetch gates 31, and generate a pixel signal integrating the electric signals. The pixel signal may be collected in one of the cells G1-G8 (e.g. cell G5 in "5th Step" in FIG. 13) of the collector/distributor 41 by setting the remaining cells to the OFF state successively from the remote cell (cell G1 in FIG. 13). In this way, the pixel signal may be delivered to a selected one of the store and forward lines 27.

With such collector/distributor 41, the construction may be simplified compared with the second embodiment. With the plurality of photoelectric converters 21 and the plurality of store and forward lines 27, the image sensor can, of course, read electric signals from the photoelectric converters 21 reliably and quickly, leaving no electric signals unfetched. The image sensor can suppress heat generation accompanying clocking on the cells of the store and forward lines 27.

Fourth Embodiment

Figure 14:
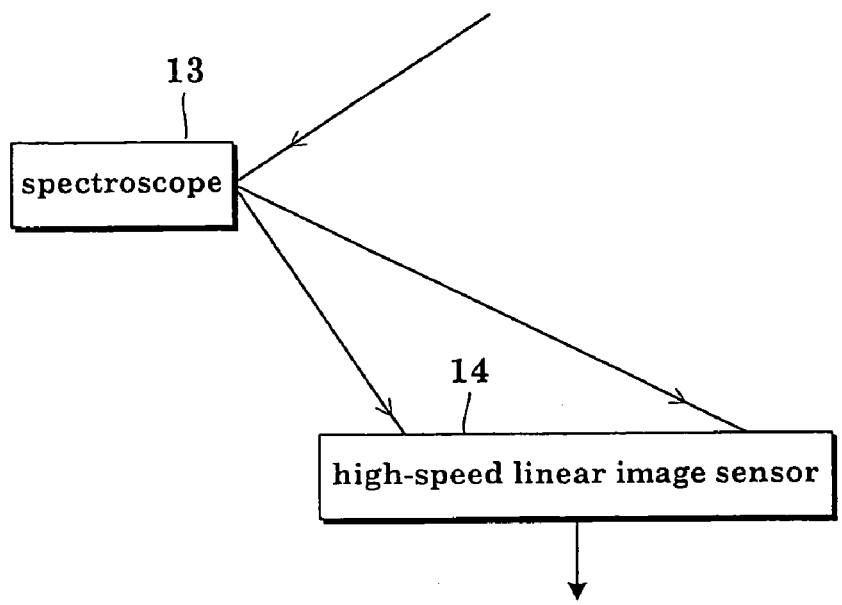
FIG. 14 is a block diagram showing a principal portion of a high-speed spectrum analyzing apparatus using a high-speed linear image sensor in a fourth embodiment.

A high-speed linear image sensor, in the fourth embodiment, of the optical image information detecting apparatus according to this invention will be described with reference to the drawings. FIG. 14 is a block diagram showing a principal portion of a high-speed spectrum analyzing apparatus using the high-speed linear image sensor in the fourth embodiment.

The high-speed spectrum analyzing apparatus shown in FIG. 14 is capable of acquiring spectra in time of fluorescence annihilation at very short intervals of one microsecond. The apparatus includes a spectroscope 13 for dispersing fluorescence to be detected, and a high-speed linear image sensor 14 for detecting spectral information. The spectroscope 13 uses a spectral device such as a diffraction grating, for example.

Figure 15:
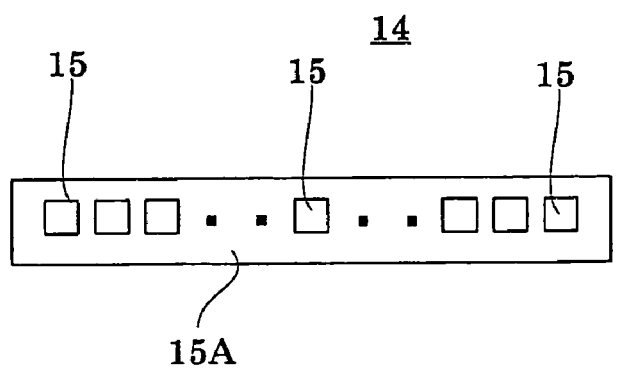
FIG. 15 is an explanatory view showing an arrangement of spectral information detecting units of the high-speed linear image sensor in the fourth embodiment.

As shown in FIG. 15, the high-speed linear image sensor 14 in the fourth embodiment has a detecting surface 14A for receiving light dispersed by the spectroscope 13. The detecting surface 14A has a required number of (e.g. 1,000) spectral information detecting units 15 arranged linearly along a one-dimensional array line.

Each spectral information detecting unit 15 has the same internal structure as the image information detecting unit 10 in the first embodiment shown in FIGS. 5 and 6, the image information detecting unit 10 in the second embodiment shown in FIGS. 8 and 9, and the image information detecting unit 10 in the third embodiment shown in FIG. 11. Its detecting operation is similar to those of the image information detecting unit 10 in the first embodiment shown in FIG. 7, the image information detecting unit 10 in the second embodiment shown in FIGS. 10A-10C, and the image information detecting unit 10 in the third embodiment shown in FIGS. 12A-12C and 13. Thus, the common features will not be described again.

Thus, the image information detecting units 10 of the first to third embodiments may replace the spectral information detecting units 15 of the fourth embodiment, to apply the constructions of the first to third embodiments to the fourth embodiment. The high-speed linear image sensor 14 corresponds to the optical image information detecting apparatus in this invention. The spectral information detecting units 15 correspond to the image information detecting units in this invention.

With the high-speed linear image sensor 14, in principle, one spectral information detecting unit 15 detects the intensity of one particular wavelength in a spectrum as spectral information.

That is, the spectroscope 13 irradiates the detecting surface of the high-speed linear image sensor 14 at high speed with light having spectral information with wavelengths of the light assigned to the respective spectral information detecting units 15. Specifically, the light of the shortest wavelength impinges on the spectral information detecting unit 15 at one end, with the wavelength of incident light gradually increasing away from that end, and the light of the longest wavelength impinges on the spectral information detecting unit 15 at the other end.

When detecting spectra at high speed with the high-speed spectrum analyzing apparatus shown in FIG. 14, electronic shuttering is applied continually at high speed to the high-speed linear image sensor 14, with the detecting surface of the high-speed linear image sensor 14 irradiated with light from the spectroscope 13. When the electronic shuttering has been performed 80 time, electric signals are stored as spectral information in all the 80 store and forward cells C01-C10 (the store and forward cells C01-C10 in the first embodiment) of each spectral information detecting unit 15. These electric signals correspond to the light intensities of the assigned wavelengths in each spectrum. The electronic shuttering is stopped when the electric signals have been stored in all the store and forward cells C01-C10, and the electric signals stored in the store and forward cells C01-C10 are outputted similarly. Then, a signal processing is performed at the downstream stage, to create an image by integrating spectral information acquired by the same electronic shuttering into one spectrum.

Figure 16:
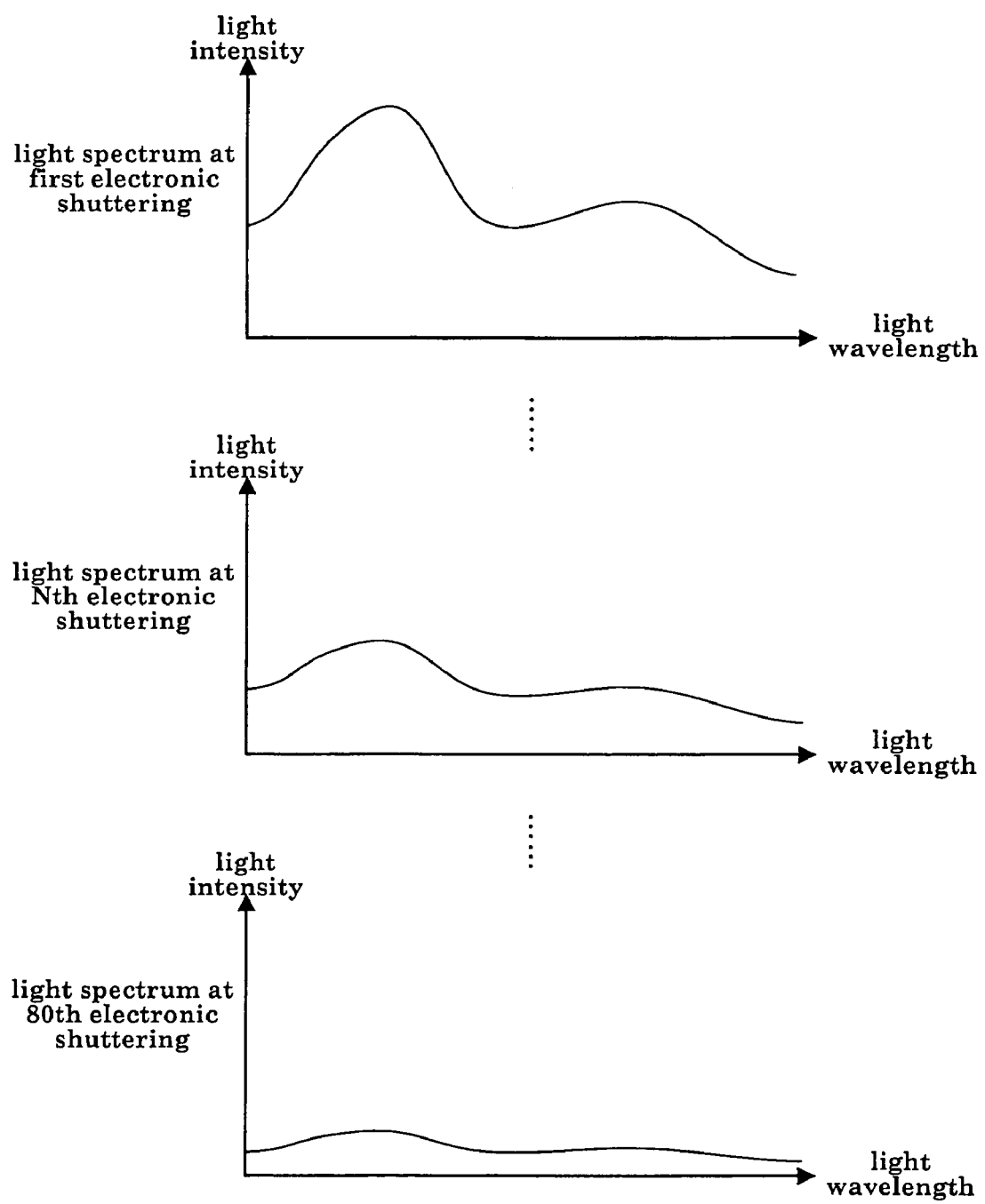
FIG. 16 is a graph showing spectra obtained with the high-speed spectrum analyzing apparatus in the fourth embodiment.

As shown in FIG. 16, the number of spectra obtained corresponds to the number of times of electronic shuttering. Thus, the high-speed spectrum analyzing apparatus shown in Fig. creates images by continually acquiring spectra in time of fluorescence annihilation at the very short intervals of one microsecond. The apparatus enables a precise analysis of the life of fluorescence.

With the high-speed linear image sensor 14 in the fourth embodiment also, as described above, the spectral information detecting units 15 realize the functions and effects of the first to third embodiments according to the constructions of the first to third embodiments.

This invention is not limited to the above embodiments, but may be modified as follows:

(1) Each image information detecting unit 10 in the first embodiment has one photoelectric converter 11 and eight store and forward lines T1-T8. Each image information detecting unit 10 in the second and third embodiments has eight photoelectric converters 21 and eight store and forward lines 27. Each of the store and forward lines T1-T8 in the first embodiment includes ten cells. Each of the store and forward lines 27 in the second and third embodiments includes eight cells. These numbers may be varied as appropriate. The second and third embodiments need not be the same in the number of such components. The number of cells forming each collector 23 or distributor 25 in the second embodiment also is variable as appropriate.

(2) In the embodiments described above, photodiodes are used as photoelectric converters 11 and 21. Instead, photogates may be used. A photogate has an application electrode on a photosensitive portion thereof, and thus capable of forcibly forming a potential gradient to discharge generated electric signals forcibly.

Figure 17:
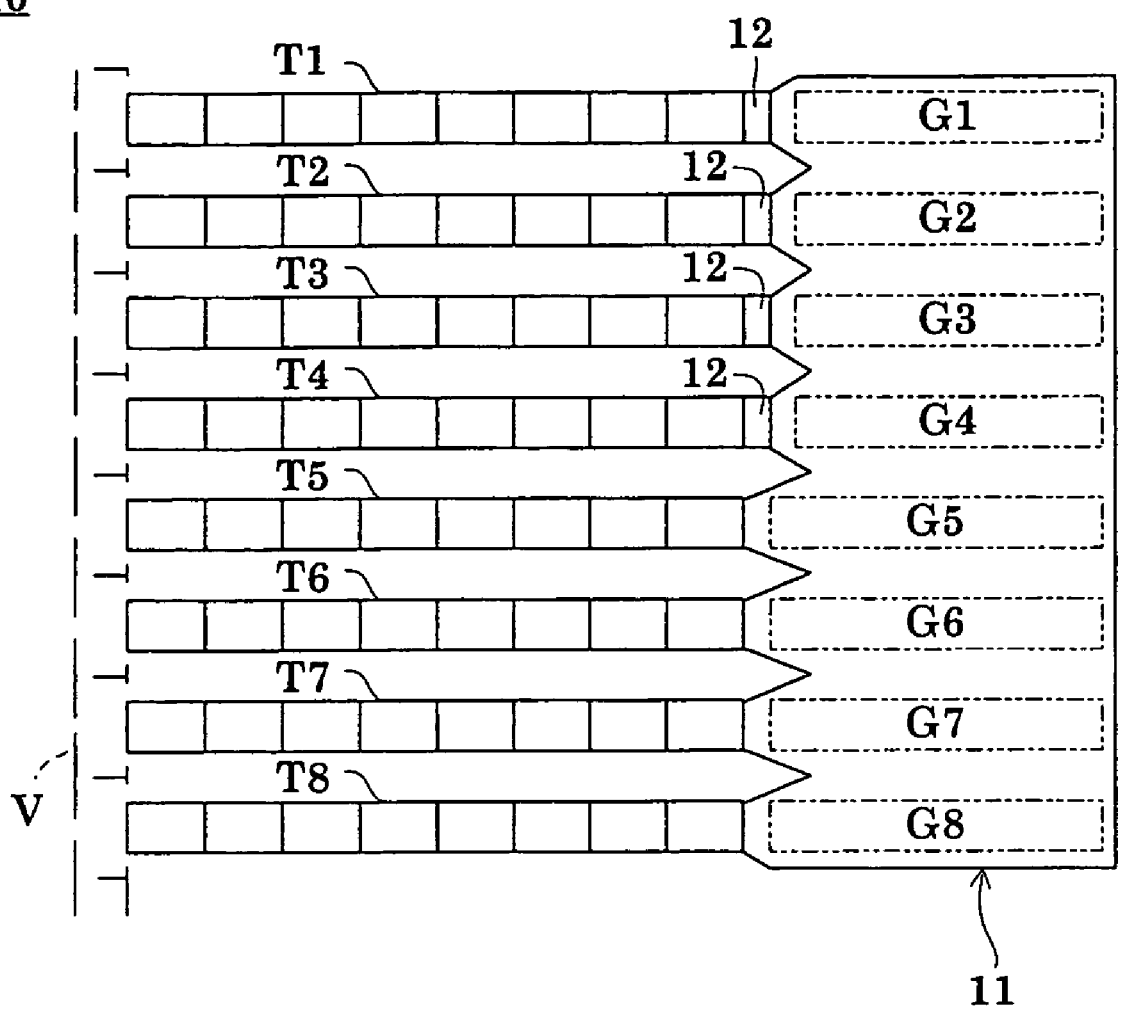
FIG. 17 is a schematic view showing operation of a modified image information detecting unit.

(3) In the first embodiment described above, the photoelectric converter 11 may have a photogate structure, with a plurality of gate electrodes (transparent electrodes) arranged on the photoelectric converter 11, thereby adding the same charge collecting and distributing functions as in the third embodiment. In FIG. 17, for example, a photoelectric converter 11 is covered with eight transparent electrodes G1-G8. When the photoelectric converter 11 starts exposure, a positive voltage is applied to the transparent electrodes G1-G8 to set them to the ON state. Then, before a shift is made from the exposure state to a transfer state, the electrodes other than the transparent electrode G5 aligned with the store and forward line T5, which is the destination, are set to the OFF state as shown in FIG. 13, for example. Consequently, all electric charges are collected under the transparent electrode G5. Then, the transfer state starts, and after the first cell of the store and forward line T5 is set to the ON state, the transparent electrode G5 is shifted to the OFF state to transfer the electric charges. Thus, the charges may be transferred quickly from the large photoelectric converter 11 to relatively small cells of the store and forward lines without generating an afterimage. In the photogate structure, as in the above example, the photogates per see have the function of signal fetch gates. Thus, signal fetch gates are not essential here.

(4) The high-speed image sensor 2 in the first embodiment and the high-speed linear image sensor 14 in the fourth embodiment receive the gate drive signals r1-r8 all supplied from outside. Only the gate drive signal r1 may be supplied to the high-speed image sensor 2 or high-speed linear image sensor 14, and shift registers or delay devices may be built into the high-speed image sensor 2 or high-speed linear image sensor 14 to generate gate drive signals r2-r8 from the gate drive signal r1. This construction provides advantages of reducing the number of signal input terminals of the high-speed image sensor 2 or high-speed linear image sensor 14, and simplifying drive circuits.

(5) The store and forward lines T1-T8 of the high-speed image sensor 2 in the first embodiment and the high-speed linear image sensor 14 in the fourth embodiment are arranged to forward electric signals in the four-phase drive mode. Instead, the store and forward lines T1-T8 may be constructed to forward the electric signals in a two-phase drive mode or a three-phase drive mode.

(6) The optical image information detecting apparatus of this invention are not limited in application to the high-speed photographic apparatus or high-speed spectrum analyzing apparatus shown in the first to fourth embodiments, but are applicable also to apparatus other than the high-speed photographic apparatus and high-speed spectrum analyzing apparatus.

This invention may be embodied in other specific forms without departing from the spirit or essential attributes thereof and, accordingly, reference should be made to the appended claims, rather than to the foregoing specification, as indicating the scope of the invention.

What is claimed is:

1. An optical image information detecting apparatus having photoelectric converter for generating electric signals according to intensities of incident light, comprising:

signal fetch means for fetching the electric signals generated in said photoelectric converter;

first store and forward means for forwarding the electric signals fetched and delivered by said signal fetch means; and temporary signal holding means for temporarily holding the electric signals received from said signal fetch means;

wherein said signal fetch means, M in number, M being an integer at least two, are connected in parallel with one another to said photoelectric converter, one in number;

each of said first store and forward means includes cells, N in number, N being an integer at least two, connected in series, and is connected to one of said signal fetch means;

said signal fetch means are arranged to fetch the electric signals repeatedly in a predetermined order; and each of said first store and forward means is arranged to forward electric signals previously delivered from one of said signal fetch means, successively to downstream cells, by the time a next electric signal is delivered; and wherein said temporary signal holding means are disposed between said signal fetch means having signal fetch timing coinciding with a signal non-acceptance time of said first store and forward means that receive the electric signals first, and the cells of said first store and forward means that receive the electric signals first; and said temporary signal holding means are arranged to hold said electric signals until said first store and forward means shift to a signal acceptance state.

2. An optical image information detecting apparatus as defined in claim 1, wherein said apparatus includes a plurality of image information detecting units arranged along array lines, each of said image information detecting units having said photoelectric converter, said signal fetch means, and said first store and forward means.

3. An optical image information detecting apparatus as defined in claim 2, wherein said plurality of image information detecting units are arranged longitudinally and transversely along two-dimensional array lines.

4. An optical image information detecting apparatus as defined in claim 3, wherein said image information detecting units arranged longitudinally and transversely along the two-dimensional array lines constitute an image sensor.

5. An optical image information detecting apparatus as defined in claim 2, wherein said plurality of image information detecting units are arranged linearly along a one-dimensional array line.

6. An optical image information detecting apparatus as defined in claim 5, wherein said image information detecting units arranged along the one-dimensional array line constitute a linear image sensor for detecting spectral information.

7. An optical image information detecting apparatus as defined in claim 2, wherein the number M of said signal fetch means in each of said image information detecting units is in a range of five to 15, and the number N of the cells of said first store and forward means is in a range of five to 15.

8. An optical image information detecting apparatus having photoelectric conversion means for generating electric signals according to intensities of incident light, comprising:

signal fetch means provided for each of said photoelectric conversion means for fetching the electric signals generated in said photoelectric conversion means;

collecting means for receiving the electric signals from a plurality of said signal fetch means, and generating a pixel signal integrating said electric signals;

distributing means for receiving the pixel signals from said collecting means; and second store and forward means for receiving the pixel signals from said distributing means, and forwarding the pixel signals;

wherein the plurality of said photoelectric conversion means, the plurality of said signal fetch means and said one collecting means are arranged to acquire pixel signals each corresponding to one pixel; and wherein each of said second store and forward means includes a plurality of cells connected in series for storing the pixel signals, and is arranged to forward the pixel signals from cell to cell;

said distributing means is arranged to deliver the pixel signals successively to first cells of the respective second store and forward means; and the plurality of said second store and forward means and the one distributing means are arranged to acquire the pixel signals each corresponding to one pixel, the pixel signals stored in all the cells of said second store and forward means being forwarded all at once each time the pixel signals delivered from said distributing means to said second store and forward means have been stored in all the first cells.

9. An optical image information detecting apparatus as defined in claim 8, wherein said apparatus includes a plurality of image information detecting units arranged along array lines, each of said image information detecting units having said photoelectric conversion means, said signal fetch means, and said collecting means.

10. An optical image information detecting apparatus as defined in claim 9, wherein said plurality of image information detecting units are arranged longitudinally and transversely along two-dimensional array lines.

11. An optical image information detecting apparatus as defined in claim 10, wherein said image information detecting units arranged longitudinally and transversely along the two-dimensional array lines constitute an image sensor.

12. An optical image information detecting apparatus as defined in claim 9, wherein said plurality of image information detecting units are arranged linearly along a one-dimensional array line.

13. An optical image information detecting apparatus having photoelectric conversion means for generating electric signals according to intensities of incident light, comprising:

signal fetch means provided for each of said photoelectric conversion means for fetching the electric signals generated in said photoelectric conversion means;

collecting and distributing means for receiving the electric signals from a plurality of said signal fetch means, and generating a pixel signal integrating said electric signals; and a plurality of second store and forward means for receiving the pixel signals from said collecting and distributing means, and forwarding the pixel signals;

wherein each of said second store and forward means includes a plurality of cells connected in series for storing the pixel signals, and is arranged to forward the pixel signals from cell to cell;

said collecting and distributing means is arranged to deliver the pixel signals successively to first cells of the respective second store and forward means;

the plurality of said photoelectric conversion means and the plurality of said signal fetch means, the one collecting and distributing means and the plurality of said second store and forward means are arranged to acquire the pixel signals each corresponding to one pixel; and the pixel signals stored in all the cells of said second store and forward means are forwarded all at once each time the pixel signals delivered from said collecting and distributing means to said second store and forward means have been stored in all the first cells.

14. An optical image information detecting apparatus as defined in claim 13, wherein said apparatus includes a plurality of image information detecting units arranged along array lines, each of said image information detecting units having said photoelectric conversion means, said signal fetch means, said collecting and distributing means, and said second store and forward means.

15. An optical image information detecting apparatus as defined in claim 14, wherein said plurality of image information detecting units are arranged longitudinally and transversely along two-dimensional array lines.

16. An optical image information detecting apparatus as defined in claim 15, wherein said image information detecting units arranged longitudinally and transversely along the two-dimensional array lines constitute an image sensor.

17. An optical image information detecting apparatus as defined in claim 14, wherein said plurality of image information detecting units are arranged linearly along a one-dimensional array line.

* * * * *